United States Patent
Sorbera et al.

(12) 
(10) Patent No.: US 11,855,320 B2
(45) Date of Patent: Dec. 26, 2023

(54) FUEL LEAK DETECTION IN FUEL CELL STACK

(71) Applicant: HYDROGENICS CORPORATION, Mississauga (CA)

(72) Inventors: Sonia Sorbera, Woodbridge (CA); Robert Bencak, Georgetown (CA); Prabhsimran Malhi, Brampton (CA); Luke Fregonese, Toronto (CA)

(73) Assignee: HYDROGENICS CORPORATION, Mississauga (CA)

( * ) Notice: Subject to any disclaimer, the term of this patent is extended or adjusted under 35 U.S.C. 154(b) by 0 days.

(21) Appl. No.: 18/168,323

(22) Filed: Feb. 13, 2023

(65) Prior Publication Data
US 2023/0275244 A1  Aug. 31, 2023

Related U.S. Application Data

(60) Provisional application No. 63/313,832, filed on Feb. 25, 2022.

(51) Int. Cl.
*H01M 8/04* (2016.01)
*H01M 8/04664* (2016.01)
(Continued)

(52) U.S. Cl.
CPC ... *H01M 8/04679* (2013.01); *H01M 8/04228* (2016.02); *H01M 8/04559* (2013.01); *H01M 8/04753* (2013.01)

(58) Field of Classification Search
CPC ......... H01M 8/04679; H01M 8/04671; H01M 8/04228; H01M 8/04223; H01M 8/04559;
(Continued)

(56) References Cited

U.S. PATENT DOCUMENTS 7,282,281 B2  10/2007  Mattejat et al.
8,524,405 B2   9/2013  Salvador et al.
(Continued)

FOREIGN PATENT DOCUMENTS

JP  2009259519  11/2009
JP  2013246984  12/2013
(Continued)

*Primary Examiner* — Raymond Alejandro
(74) *Attorney, Agent, or Firm* — Barnes & Thornburg LLP

(57) ABSTRACT

The present disclosure generally relates to systems and methods for detecting a hydrogen leak in a fuel cell system including initiating a shutdown process of a fuel cell stack in the fuel cell system by a controller, measuring a volume of hydrogen in a reservoir, pulsing a volume of hydrogen into the reservoir or pulsing hydrogen directly into the fuel cell stack if the volume of hydrogen is insufficient to sustain a voltage discharge process during the shutdown process, making the fuel cell system enter a discharge state by the controller, wherein hydrogen and oxygen in the fuel cell stack are consumed in an electrochemical reaction to discharge voltage in the fuel cell stack, measuring a rate of the voltage discharge by the controller, and detecting the hydrogen leak based on the rate of the voltage discharge or via negative pressure measurements made at the anode inlet.

20 Claims, 8 Drawing Sheets

(51) Int. Cl.
*H01M 8/04537* (2016.01)
*H01M 8/04746* (2016.01)
*H01M 8/04228* (2016.01)

(58) Field of Classification Search
CPC ......... H01M 8/04552; H01M 8/04753; H01M 8/04783
See application file for complete search history.

(56) References Cited

U.S. PATENT DOCUMENTS

| | | |
|---|---|---|
| 9,065,126 B2 | 6/2015 | Kanuri et al. |
| 2001/0055705 A1* | 12/2001 | Yagi .................. H01M 8/04228 429/413 |
| 2005/0026022 A1 | 2/2005 | Joos |
| 2006/0166060 A1 | 7/2006 | Miura |
| 2006/0210850 A1* | 9/2006 | Abouatallah ..... H01M 8/04902 429/432 |
| 2010/0062290 A1 | 3/2010 | Reinert et al. |
| 2010/0098976 A1* | 4/2010 | Yeh .................. H01M 8/04679 429/446 |
| 2019/0267646 A1 | 8/2019 | Yamanaka et al. |

FOREIGN PATENT DOCUMENTS

| | | |
|---|---|---|
| JP | 2014192033 | 10/2014 |
| JP | 2015125873 | 7/2015 |

\* cited by examiner

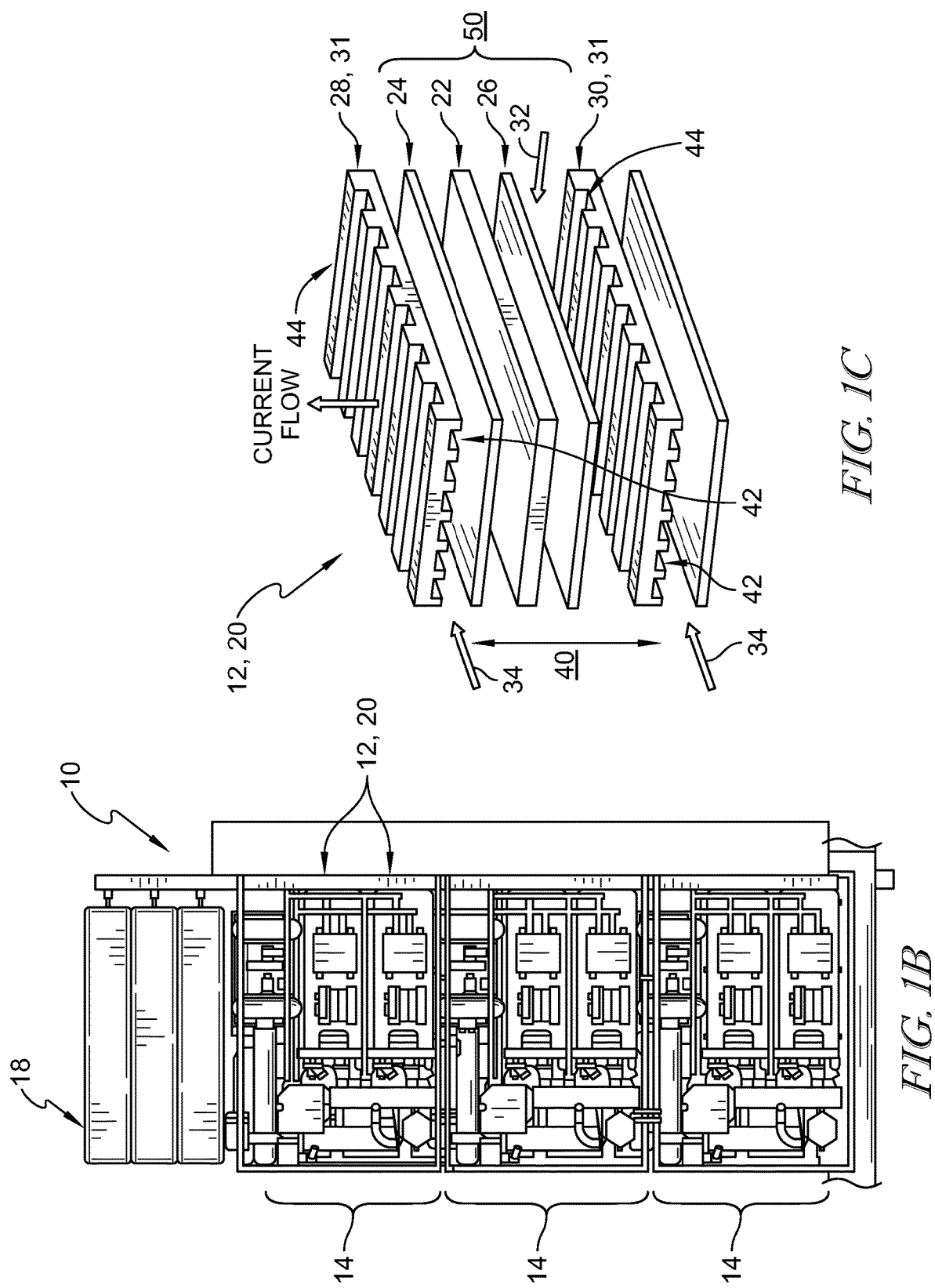

FUEL LEAK DETECTION IN FUEL CELL STACK

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/313,832 filed on Feb. 25, 2022, the entire disclosure of which is hereby expressly incorporated herein by reference.

TECHNICAL FIELD

The present disclosure relates to systems and methods for detecting a fuel leak in a fuel cell system.

BACKGROUND

The fuel cell is a multi-component comprising a membrane electrode assembly (MEA) at the center, a gas diffusion layer (GDL) on both sides of the membrane electrode assembly (MEA), and a bipolar plate (BPP) on the other side of the gas diffusion layer (GDL). The membrane electrode assembly (MEA) is a component that enables electrochemical reactions in the fuel cell. The GDL positioned adjacent to the MEA facilitates the diffusion of reactants, manages the water transport within the fuel cell stack, protects the MEA from the flow field channels, and improves electrical conductivity.

During fuel cell stack shutdown, reactants may still be present at the anode (e.g., hydrogen or a hydrocarbon) and the cathode (e.g., air). The reactants can travel through the micropores of a membrane in the MEA. However, the membrane may develop a gas crossover leak due to age, usage, and/or environment contamination, Additionally, or alternatively an external leak may develop due to poor sealing or faulty bipolar plates.

Detection of such leaks is essential for optimizing operation of the fuel cell system. Hydrogen leaks within fuel cell systems may cause harm or affect the efficacy of the system. Hydrogen is a flammable gas that when released in confined spaces, non-ventilated, or poorly ventilated areas may lead to a fire and/or an explosion. Thus, the present disclosure is directed to systems and methods to detect hydrogen leaks based on the voltage discharged in the fuel cell system or based on the change in pressure at the anode of the fuel cell system.

SUMMARY

Embodiments of the present disclosure are included to meet these and other needs.

A one aspect, described herein, is a method of detecting a hydrogen leak in a fuel cell system. The method comprises initiating a shutdown process of a fuel cell stack in the fuel cell system by a controller, measuring a volume of hydrogen in a hydrogen reservoir, replenishing the volume of hydrogen in the reservoir when the volume of hydrogen cannot sustain a voltage discharge during the shutdown process, discharging voltage in the fuel cell stack of the fuel cell system by the controller, wherein hydrogen and oxygen in the fuel cell stack are consumed in an electrochemical reaction, measuring a rate of the voltage discharge by the controller, and detecting the hydrogen leak based on the rate of the voltage discharge.

In some embodiments, the system may comprise detecting an open purge valve in the fuel cell system. In some embodiments, the voltage may be discharged by a discharge resistor. In some embodiments, the hydrogen leak may occur through an external leak or through an anode to cathode crossover in the fuel cell stack.

In some embodiments, the method may comprise detecting the hydrogen leak based on the rate of the voltage discharge comprises correlating the rate of voltage discharge to an expectant rate of voltage discharge in the fuel cell stack. In some embodiments, the method may comprise correlating the rate of voltage discharge to the expectant rate of voltage discharge comprises utilizing a look-up table, a map, an experimental data, or a calculation.

In some embodiments, the method may comprise monitoring a minimum anode negative pressure achieved in a predetermined time period. In some embodiments, the method may comprise determining that a hydrogen supply valve and one or more purge valves in the fuel cell system are closed before monitoring the minimum anode negative pressure. In some embodiments, the method may comprise correlating the minimum anode negative pressure to an acceptable leak value based on a baseline level of an acceptable leak for the fuel cell stack at beginning of life of the fuel cell stack.

In some embodiments, the method may comprise monitoring a minimum anode negative pressure achieved for an additional period after has the fuel cell stack has been discharged to a stack voltage of about 5V.

In another aspect, described herein, is a fuel cell system. The fuel cell system may comprise a fuel cell stack including an anode and a cathode, a discharge resistor operable to discharge voltage from the fuel cell stack, a system controller operable to measure a rate of voltage discharge, and determine or identify a presence of a hydrogen leak in the fuel cell system based on the discharge voltage.

In some embodiments, the system controller may be operable to determine the hydrogen leak based on a measurement of a minimum anode negative pressure achieved in a predetermined time period. In some embodiments, the additional time period may range from about 2 minutes to about 2 hours. In some embodiments, the system controller may use a look-up table, a map, an experimental data, or a calculation to determine the hydrogen leak. In some embodiments, the system controller may be operable to identify the presence of the hydrogen leak based on a rate of pressure drop in the anode or a hydrogen manifold at the end of operation of the fuel cell system.

In some embodiments, the pressure drop is after an additional time period after the end of operation of the fuel cell system. In some embodiments, the additional time period may be about 1 second to about 300 seconds.

In some embodiments, the system controller may be operable to identify the hydrogen leak of greater than about 200 μm in diameter. In some embodiments, the discharge resistor may be operable to discharge voltage from the fuel cell stack for voltage discharge time, and wherein the controller may be operable to output an error message indicating that the hydrogen leak check has failed if the voltage discharge time is less than a predetermined discharge time period. In some embodiments, the predetermined discharge time period may be about 1 second to about 50 seconds.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein:

FIG. 1B is a cutaway view of an exemplary fuel cell system including an air delivery system, hydrogen delivery systems, and a plurality of fuel cell modules each including multiple fuel cell stacks;

FIG. 1C is a perspective view of an exemplary repeating unit of a fuel cell stack of the fuel cell system of FIG. 1A;

DETAILED DESCRIPTION

The present disclosure relates to systems and methods for detecting fuel leak in a fuel cell system. The present disclosure is directed to implementing a controller to determine, predict, or identify a hydrogen leak in a fuel cell system based on a rate of stack voltage discharge in the fuel cell system or on the basis of a minimum anode stack inlet pressure in the fuel cell system. The present disclosure is directed to hydrogen leaks that may occur at multiple different locations in the fuel cell system.

Figure 1A:
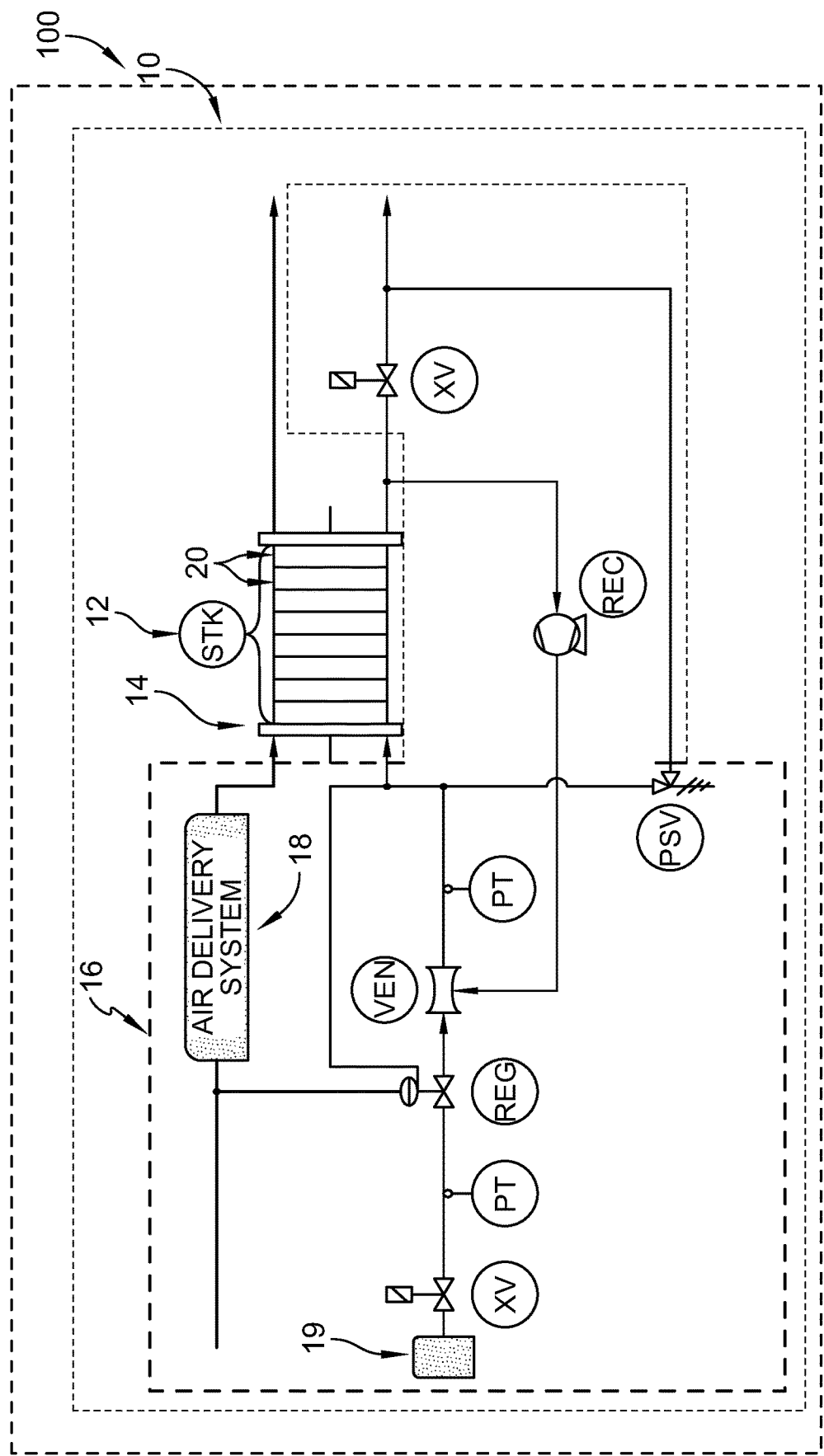
FIG. 1A is a schematic view of an exemplary fuel cell system including an air delivery system, a hydrogen delivery system, and a fuel cell module including a stack of multiple fuel cells.

As shown in FIG. 1A, fuel cell systems 10 often include one or more fuel cell stacks 12 or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals, and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26, as shown in FIG. 1C. The above-mentioned components, in particular the bipolar plate 30, the gas diffusion layer (GDL) 26, the membrane electrode assembly (MEA) 22, and the gas diffusion layer (GDL) 24 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
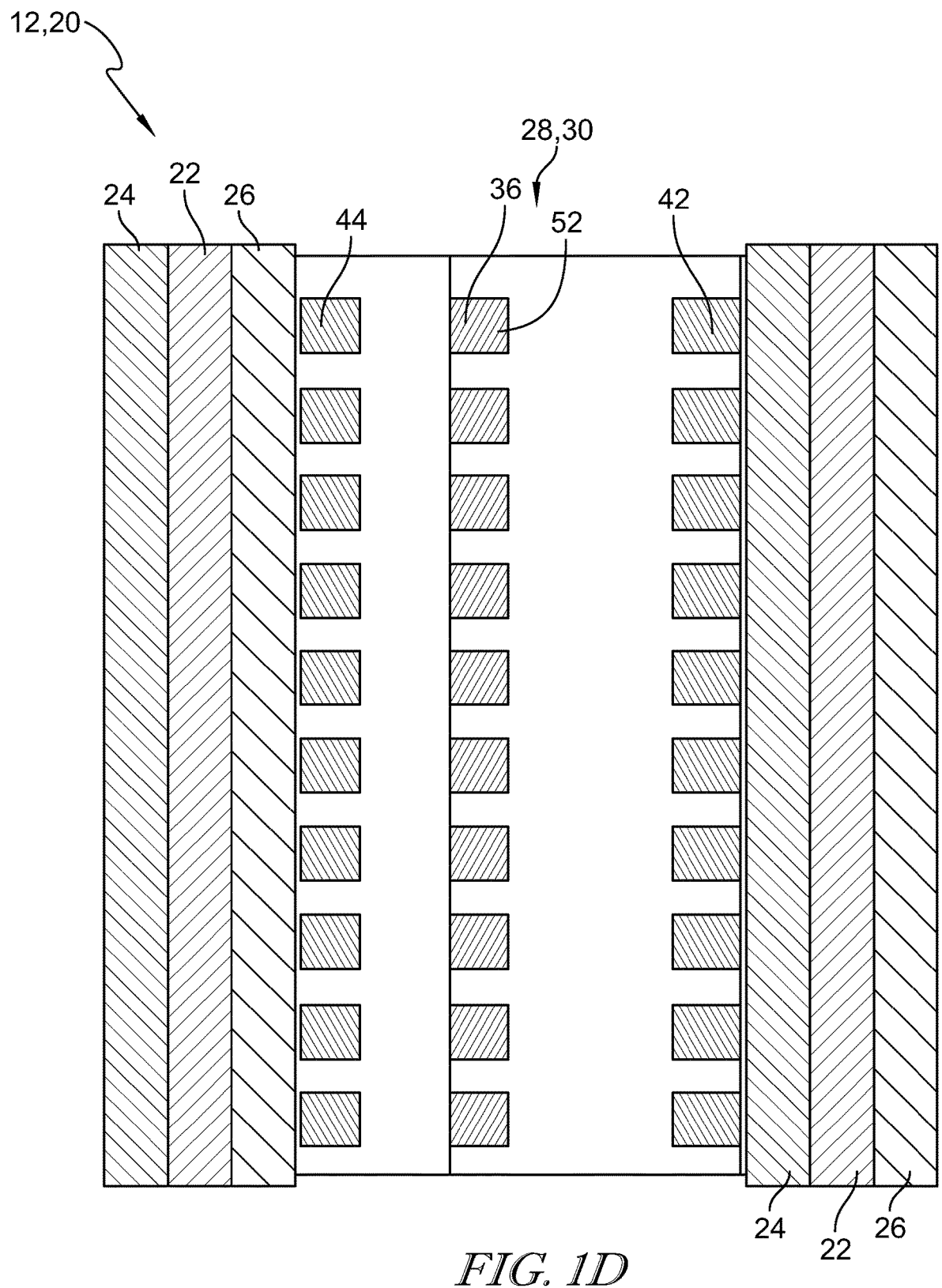
FIG. 1D is a cross-sectional view of an exemplary repeating unit of the fuel cell stack of FIG. 1C.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24. As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power system, such as industrial applications and power generation plants. The fuel cell system 10 may also be implemented in conjunction with an air delivery system 18. Additionally, the fuel cell system 10 may also be implemented in conjunction with a hydrogen delivery system and/or a source of hydrogen 19 such as a pressurized tank, including a gaseous pressurized tank, cryogenic liquid storage tank, chemical storage, physical storage, stationary storage, an electrolysis system or an electrolyzer. In one embodiment, the fuel cell system 10 is connected and/or attached in series or parallel to a hydrogen delivery system and/or a source of hydrogen 19, such as one or more hydrogen delivery systems and/or sources of hydrogen 19 in the BOP 16 (see FIG. 1A). In another embodiment, the fuel cell system 10 is not connected and/or attached in series or parallel to a hydrogen delivery system and/or a source of hydrogen 19.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

In addition, it may be appreciated by a person of ordinary skill in the art that the fuel cell system 10, fuel cell stack 12, and/or fuel cell 20 described in the present disclosure may be substituted for any electrochemical system, such as an electrolysis system (e.g., an electrolyzer), an electrolyzer stack, and/or an electrolyzer cell (EC), respectively. As such, in some embodiments, the features and aspects described and taught in the present disclosure regarding the fuel cell system 10, stack 12, or cell 20 also relate to an electrolyzer, an electrolyzer stack, and/or an electrolyzer cell (EC). In further embodiments, the features and aspects described or taught in the present disclosure do not relate, and are therefore distinguishable from, those of an electrolyzer, an electrolyzer stack, and/or an electrolyzer cell (EC).

Referring back to a fuel cell system 10, stack 12, or cell 20, a gas (e.g., hydrogen) may crossover from an anode to a cathode side or from the cathode to the anode side during operation or shutdown to create a leak. This leak (also referred to as a gas crossover, a crossover leak or crossover leakage, a hydrogen leak, or a hydrogen crossover leak) in the fuel system 10, stack 12, or cell 20 may occur because of existing concentration gradients, pressure gradients, and/or permeability of the MEA 22. This hydrogen crossover leak across the MEA 22 may develop over time due to usage of and/or age of the fuel cell stack 12.

Additionally, hydrogen supply pressure may also result in a different minimum negative pressure at the anode inlet 114. The system or method of the present disclosure also accounts for the crossover leak as it relates to varying hydrogen supply pressure. When hydrogen is lost, and not electrochemically consumed due to the crossover leak, fuel cell 20, stack 12, and system 10 efficiency may decrease and electrode (e.g., anode and/or cathode) degradation may occur.

Direct combustion of hydrogen and/or oxygen create heat that may result in the degradation of the MEA 22, resulting in the formation of a pinhole in the MEA 22. Alternatively or additionally, particulates from the fuel or oxidant may enter the fuel cell stack 12 and result in a pinhole in the MEA 22 of the fuel cell stack 12.

While typically ranging from about $\frac{1}{10000}$ inch to about $\frac{1}{10}$ inch in diameter when formed, with usage of the fuel cell stack 12, the pinhole may increase in size. As the pinhole becomes larger, electrochemical reactions may not be able to be sustained due to a lack of reactants in one or more fuel cells 20 and/or in the fuel cell stack 12. This may decrease the overall fuel cell system 10 efficiency, result in fuel cell 20 or fuel cell stack 12 instability, and the inability of the fuel cell system 10 to produce power.

Therefore, gas crossover and/or crossover leakage are a key factor that determines the lifetime of a fuel cell stack 12. Leak detection is typically done via a pressure discharge method or by implementing methods to determine crossover by utilizing hydrogen sensors at the exhaust of a fuel cell system 10. However, hydrogen sensors may not function adequately in a humidified environment of the exhaust of the fuel cell system 10, as condensing water often damages such sensors. Additionally, the hydrogen sensor stream may need to be dried, thus adding to the complexity and cost of detecting hydrogen leaks. Therefore, as described below, other systems and methods are needed to safely and accurately detect hydrogen leaks in the fuel cell system 10.

Figure 2:
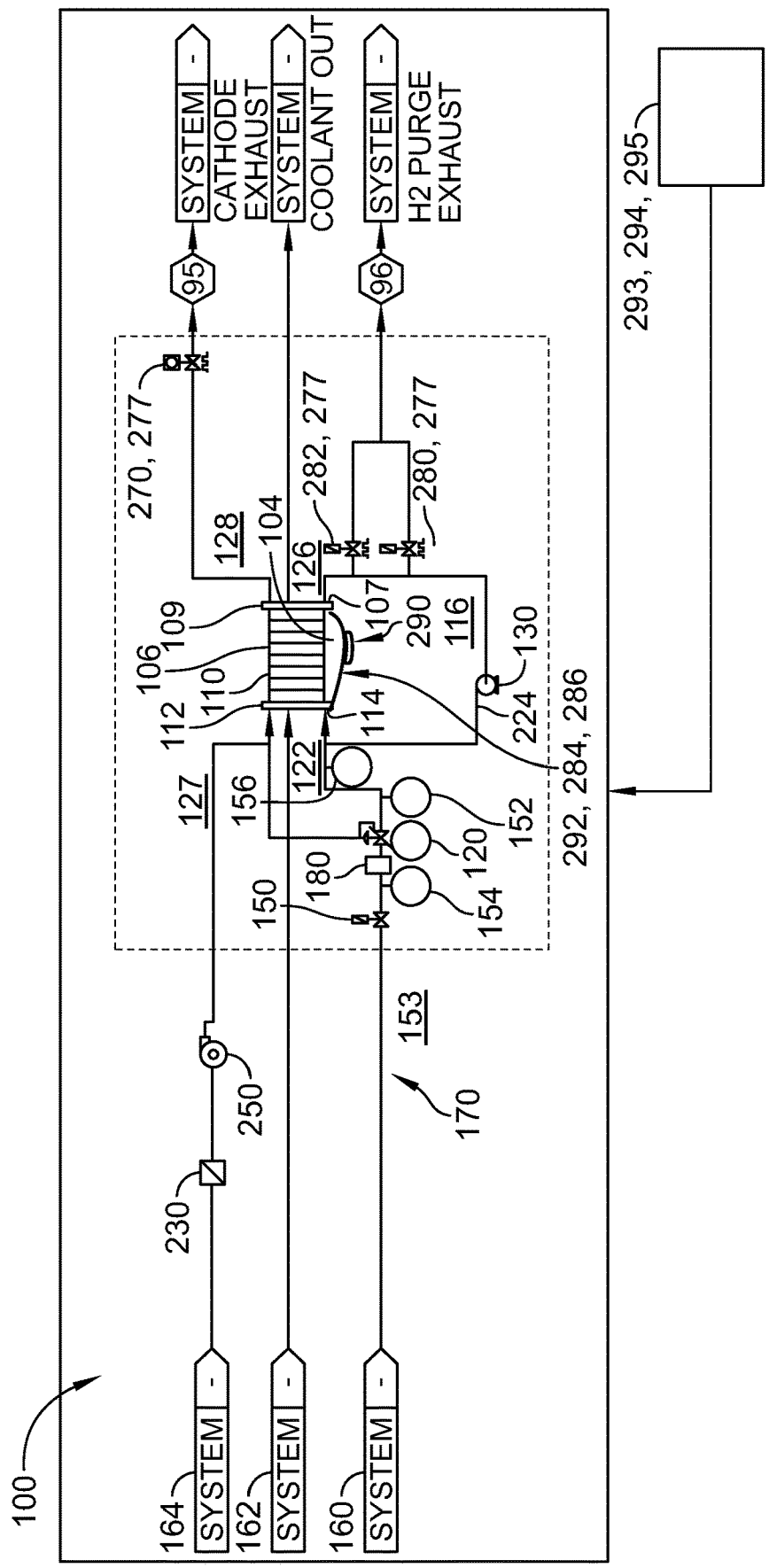
FIG. 2 is a schematic of an example of one embodiment of a fuel cell stack system.

FIG. 2 illustrates an embodiment of the fuel cell system 10. The fuel cell system 10 comprises the fuel cell stack 12, a fuel supply source 160 (e.g., a hydrogen supply source), a coolant source 162, and an oxidant supply source 164. In other embodiments, the fuel cell system 10 may include more than one fuel cell stack 12. Flow of fuel (e.g., hydrogen) from the hydrogen supply source 160 is controlled by a fuel supply or shut off valve 150 (e.g., hydrogen supply or shut off valve).

When the hydrogen supply valve 150 is switched on, hydrogen from the hydrogen storage 160 flows through a control valve and/or regulator 120 and enters an anode inlet 114 of the fuel cell stack 12 (see FIG. 2). Typically, during operation and/or shutdown of the fuel cell system 10, hydrogen is consumed at an anode 104 of the fuel cell stack 12 and oxygen is consumed at a cathode 106 of the fuel cell stack 12. A vacuum is created at the anode 104, and nitrogen crosses over from the cathode 106 to the anode 104 during passive electrode blanketing or nitrogen blanketing. During passive electrode blanketing or nitrogen blanketing utilized during the fuel cell stack 12 operation and/or shutdown, reactants are consumed with a passive electrical load.

Though the reactants present at the anode 104 may be a mixture of reactive and non-reactive species, the passive electrical load consumes only the reactive species leaving the non-reactive species in the fuel cell stack 12. Hydrogen leaks may affect the vacuum of the negative pressure that is created at the anode 104, and thus may impact electrode blanketing and the shutdown process of the fuel cell system 10. Additionally, the voltage discharge in the fuel cell system 10 may also change during hydrogen leaks.

In some embodiments of the present disclosure, as shown in FIG. 2, a pressure and temperature sensor or transmitter 154 in a hydrogen manifold 153 measures the pressure and temperature in the hydrogen stream 170 entering the fuel cell stack 12 from the hydrogen supply source 160. A pressure and temperature sensor or transmitter 156 monitors the pressure at the anode inlet 114 during the operation, startup, and/or shutdown of the fuel cell stack 12. A pressure switch 152 is mounted on a hydrogen supply line 170. If the control valve or regulator 120 fails, then the pressure switch 152 can disable the hydrogen supply valve 150 and stop the flow of hydrogen to the fuel cell system 10.

An anode inlet flow 122 enters the fuel cell stack 12 where a portion of the hydrogen in the anode inlet flow 122 is consumed. The unconsumed portion of the anode inlet flow 122 exits the fuel cell stack 12 at an anode outlet 107 as an anode outlet flow 126. Typically, the anode inlet flow 122 is a mixture of fresh hydrogen and anode exhaust flow, and recirculated hydrogen via a secondary flow 116. The anode inlet flow 122 comprises hydrogen ($H_2$) fuel, water, and/or inert gases or nitrogen that may have diffused with air from the cathode 106 to the anode 104.

The fuel cell system 10 draws in the secondary flow 116 working against the pressure losses through a recirculation loop or an anode gas recirculation (AGR) loop 224. The secondary flow 116, also referred to as a secondary mass flow, an entrainment flow, or a recirculation flow, depends on a flow pressure across the AGR loop 224 and may be determined by the operation of a recirculation pump, a blower and/or a valve system 130. Exhaust hydrogen 96 exits the anode outlet 107 of the fuel cell stack 12 through purge valves 280, 282.

Conversely, referring back to FIG. 2, the oxidant (e.g., air, oxygen, and/or humidified air) flows from the oxidant supply source 164 into the cathode 106 of the fuel cell stack 12 as cathode inflow 127 at a cathode inlet 112. The oxidant passes through an air filter 230, a compressor and/or blower 250 before entering the cathode 106 at the cathode inlet 112 and exiting as cathode outlet flow 128. The cathode outlet flow 128 exits the fuel cell stack 12 at the cathode outlet 109 and as cathode exhaust 95 by passing through a backpressure valve and/or cathode valve 270.

The cathode valve 270 and the purge valves 280, 282 may be variable position throttle valves with angle sensors 277. The cathode valve 270 may be used as an on/off control valve to protect the cathode 106 in the fuel cell stack 12 when it is not in operation. The cathode valve 270 may also be used to provide some back pressure to the fuel cell stack 12.

The purge valves 280, 282 may be used periodically to remove water, hydrogen, and any buildup of inert gases from the anode 104 in the fuel cell stack 12. Through an engine control unit (ECU) 293, an electronically and/or pneumatically actuated hydrogen flow system 295 in communication with the hydrogen supply or shut off valve 150 and the control valve and/or regulator 120 may control the pressure balance between the anode 104 and the cathode 106. The electronically and/or pneumatically actuated hydrogen flow system 295 may ensure the mechanical robustness of the fuel cell system 10. Hydrogen recirculation through the AGR 224 aids in the humidification of the secondary flow 116 from the anode outlet 107 to the anode inlet 114 and results in the production of a higher anode stoichiometry for fuel cell system 10 stability.

As also shown in FIG. 2, a discharge resistor 290 is attached across the busbars 292 of fuel cell stack 12. The discharge resistor 290 is located between positive and negative busbars 292 of the fuel cell stack 12. For example, the busbars 292 may be connected to a DC/DC or a DC/AC converter 284 and/or a battery system 286 to distribute power. At shutdown, a very small current may flow through the discharge resistor 290 as hydrogen and/or oxygen may be electrochemically consumed.

The control valve or regulator 120 may be utilized or implemented to control the flow of fresh hydrogen, also referred to as a primary flow, a primary mass flow, a primary fuel, or a motive flow as the anode inlet flows 122 into the anode 104. The control valve 120 may be a mechanical regulator, a proportional control valve, and/or an injector.

The fuel cell system 10 may includes a hydrogen reservoir 180 to store a fixed amount of hydrogen that is used during the operation and/or shutdown of the fuel cell system 10. In some embodiments, the hydrogen reservoir 180 may be or comprise a vessel 180 that is appropriately sized to store enough hydrogen to electrochemically consume the oxygen remaining in the fuel cell stack 12 when the flow of hydrogen and oxidant is stopped during the operation and/or shutdown process.

The hydrogen reservoir 180 may comprise a predetermined length of hose or tubing (possibly coiled) for storing enough hydrogen to electrochemically consume the oxygen remaining in the fuel cell stack 12 when the flow of hydrogen and oxidant is stopped during operation and/or the shutdown process. In some embodiments, when the hydrogen reservoir 180 is smaller than required, the amount of hydrogen in the hydrogen reservoir 180 is replenished during the operation and/or shutdown process so that enough hydrogen is available to electrochemically consume the remaining oxygen.

The volume of hydrogen in the hydrogen reservoir 180 may be determined based on the volume required to sustain a voltage discharge during shutdown. The hydrogen in the hydrogen reservoir 180 may be replenished by adding hydrogen from an external source into the hydrogen reservoir 180. This replenishing or replenishment of the hydrogen reservoir 180 may be performed manually or automatically, electronically, and/or in real-time by one or more controller(s) 294.

Those skilled in the art would appreciate that the amount of hydrogen (or reactant of interest) remaining in the fuel cell stack 12 after shutdown may be taken into consideration when sizing the hydrogen reservoir 180. Furthermore, the hydrogen reservoir 180 used for operation and/or shutdown may be located on or in conjunction with the fuel cell stack 12 or off-board the fuel cell stack 12 and/or elsewhere on the fuel cell system 10.

In other embodiments, the fuel cell system 10 may include one or more fuel cell stacks 12. In some embodiments, there may also be one or multiple valves, sensors, compressors, filters, regulators, blowers, injectors, ejectors, and/or other devices in series and/or in parallel with the one or more fuel cell stacks 12.

The anode 104 and/or cathode 106 of the fuel cell stack 12 and other components of the fuel cell system 10 may communicate with the one or more controller(s) 294 via a physical signal, a virtual signal, controller area network bus (CANBUS), or an electronic signal. In some embodiments, the signal may be any type of communicative or computer signal known in the art such as CANBUS.

Physical or virtual sensing systems or methods may be used to enhance the operation of the fuel cell system 10. For example, a sensing method may be used to determine an entrainment ratio (ER) or excess fuel ratio of the fuel cell stack 12. In some embodiments, the physical or virtual sensing systems or methods may comprise one or more pressure sensors or transmitters (e.g., 154, 156) used to determine a pressure in the anode 104 and/or cathode 106. In other embodiments, one or more temperature sensors or transmitters (e.g., 154, 156) may be used to determine a temperature in the anode 104 and/or cathode 106. In some other embodiments, one or more voltage sensors may be utilized and/or implemented to determine stack voltage. The pressure, temperature, and/or voltage sensors may be monitored and/or controlled by the controller 294, individually, in groups, and/or collectively. These pressure, temperature, and/or voltage may be located at any position in the stack 12 or system 10, particularly at the anode stack inlet 114 and/or at the cathode stack inlet 112.

Hydrogen leaks can occur at any point along the hydrogen supply line 170. Typically, a hydrogen leak may occur between the hydrogen supply or shut off valve 150 and one of the purge valves 280, 282. Hydrogen leaks may occur near fasteners of any of the devices (e.g., the pressure switch high 152, the pressure and temperature sensors or transmitters 154, 156, or the control valve or regulator 120) mounted on the hydrogen supply line 170. Malfunctioning of one or more purge valves 280, 282 may also result in a hydrogen leak.

As described earlier, hydrogen leaks can occur within the fuel cell stack 12 due to a crossover flow of gas (e.g., hydrogen, oxidant) across the MEA 22 of the fuel cell stack 12. Though the MEA 22 in the fuel cell stack 12 is minimally permeable when the fuel cell stack 12 is new, hydrogen leaks can occur due to aging, usage, and/or accumulation of environmental contaminants in the fuel cell stack 12. Hydrogen leaks can also occur due to leaks in seals 31 located in the bipolar plates 28, 30 that separate oxidant flow fields 42, fuel flow fields 44, and/or coolant flow fields 52. Additionally, hydrogen leaks can occur due to cracks in one or more bipolar plates 28, 30 included in the fuel cell stack 12.

Several additional factors affect and/or cause hydrogen leaks in the fuel cell system 10. For example, when a hydrogen leak is within the fuel cell stack 12 and across the membrane electrode assembly (MEA) 22 to create a crossover effect, that hydrogen leak is affected by the internal operating temperature of the fuel cell stack 12, as well as the internal humidification within the fuel cell stack 12. Furthermore, other environmental factors, such as temperature (e.g., heat or cold) may also affect hydrogen leaks.

As described in the current disclosure, one or more methods may be used to detect or identify hydrogen leaks in the fuel cells system 10. The methods may include using the controller 294 to detect, identify, and/or communicate the identification and/or repair mechanisms of the hydrogen leaks. In one embodiment, hydrogen leaks may be detected by monitoring a rate of voltage discharge in any of the fuel cell stacks 12 of the fuel cell systems 10. Alternatively or additionally, hydrogen leaks may be detected by monitoring an anode stack inlet pressure decay rate in any of the fuel cell stacks 12 of the fuel cell systems 10. Alternatively or additionally, hydrogen leaks may be detected by monitoring a hydrogen manifold 153 pressure decay rate in any of the fuel cell stacks 12 of the fuel cell systems 10.

In one embodiment, the method of detecting hydrogen leaks in the fuel cell system 10 may include assessing a rate of voltage (e.g., stack voltage) discharge in the fuel cell stack 12. The method may include the controller 294 detecting an open purge valve 280, 282 and an external leak in the anode 104 (or anywhere else) in the fuel cell stack 12 or fuel cell system 10. The method may include the controller 294 detecting a crossover leakage from anode 104 to cathode 106 across the MEA 22 in the fuel cell system 10. The method may also include the fuel cell stack 12 undergoing a freeze preparation state and/or a shutdown via a shutdown process. The method may further include the controller 294 performing a hydrogen leak check or detection.

After completion of fuel cell operation, the fuel cell stack 12 may enter a discharge state where hydrogen and/or oxygen are used to electrochemically discharge the voltage on the fuel cell stack 12 via a discharge resistor 290. If the hydrogen reservoir 180 containing a hydrogen volume required for the shutdown process is located off-board the fuel cell stack 12, then the method of detecting a hydrogen leak includes the controller 294 toggling or pulsing the hydrogen supply or shut off valve 150 to provide sufficient hydrogen for the stack voltage to discharge in the fuel cell stack 12.

The method may further include monitoring the discharge voltage, the rate of voltage discharge, and/or by correlating the rate of voltage discharge to a leak check value. This correlation may be accomplished or performed by utilizing, incorporating, interpreting, and/or analyzing data or information from one or more look-up tables, maps, experiments and/or calculations. The leak check value may be determined to be an acceptable leak based on the characteristics of the fuel cell system 10. Hydrogen leaks in one or more of the purge valves 280, 282, an external leak in the fuel cell stack 12, and/or an anode 104 to cathode 106 crossover leak may result in a rate of voltage discharge that is different from an expectant rate of voltage. The expectant rate of voltage discharge is the rate of voltage discharge of a fuel cell stack 12, which has functioning purge valves 280, 282 and an acceptable leak or leakage.

The method of detecting a leak may further include the controller 294 monitoring a voltage discharge time. If the voltage discharge time is less than a predetermined discharge time period, the controller 294 may output an error message indicating that the hydrogen leak check has failed. Furthermore, the method may include the controller 294 locking out the fuel cell stack 12 that failed the hydrogen leak check and prevent future operation or the fuel cell stack 12 or system 10.

The predetermined discharge time period may range form about 1 second to about 300 seconds including any time period or range of time period comprised therein. For example, the predetermined discharge time period may range form about 1 second to about 60 seconds, about 60 seconds to about 100 seconds, about 100 seconds to about 150 seconds, about 150 seconds to about 200 seconds, about 200 seconds to about 250 seconds, or about 250 seconds to about 300 seconds. Hydrogen leak rates can be mapped to different stack voltage discharge rates depending on the fuel cell stack 12 design.

Figure 3:
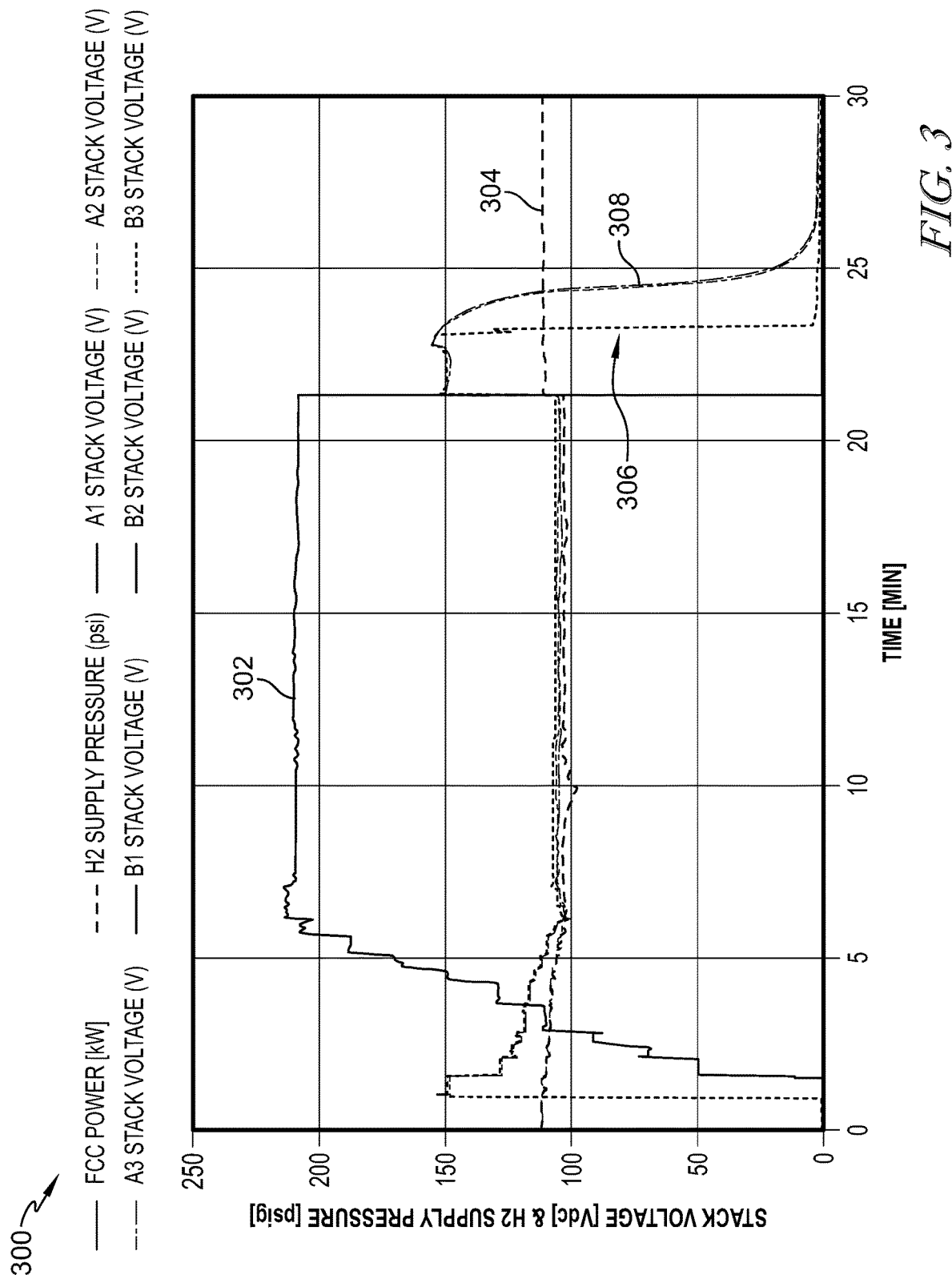
FIG. 3 is an illustration of a method of leak detection based on the rate of voltage discharge from a fuel cell stack.

FIG. 3 illustrates a simulation 300 of the fuel cell system 10 comprising six (6) fuel cell stacks 12-A1, A2, A3, B1, B2, and B3. The single purge valve 280 or 282 of fuel cell stack B3 was driven open via a power supply during shutdown in the simulation. The power of the fuel cell system 10 is shown by a curve 302. A hydrogen supply to the fuel cell system 10 shown by a curve 304 remains constant. In this example, it takes about 37 seconds for the voltage of fuel cell stack B3, as shown by a curve 306, to discharge to less than about 5 V when one of the purge valves 280 or 282 is open. Conversely, the voltage discharge times for fuel cell stacks A1, A,2, A3, B1 and B2 are approximately 3 minutes, as shown by a curve 308.

The rate of the hydrogen leak is affected by the number of purge valves that are open. In one embodiment, a hydrogen leak of about 25 liter per minute (lpm; reference of 0° C., 101.3 kPa) may occur when one of the purge valves 280 or 282 is open. In other embodiments, hydrogen leaks may be larger than 25 lpm when more than one purge valve 280, 282 is open.

In one embodiment, the method of detecting hydrogen leaks in the fuel cell system 10 may further include assessing a minimum anode stack inlet pressure at the anode inlet 114. After the voltage discharge process is completed, the method may include the controller 294 monitoring a minimum anode negative pressure achieved in a predetermined time period. The predetermined time period can range from about two minutes to about two hours, including any time or range comprised therein. The hydrogen supply or shut off valve 150 may be closed during this assessment. Additionally, the method may include using the pressure and/or temperature sensor or transmitter 156 to measure the pressure at the anode inlet 114 after the voltage has discharged.

The amount of anode negative pressure determines the occurrence of any fuel cell stack 12 crossover hydrogen leaks and/or any external hydrogen leaks. If there is a hydrogen leak, instead of the hydrogen being electrochemically consumed via the discharge resistor 290 across the fuel cell stack 12, the hydrogen may be exhausted to the external environment. Additionally, the hydrogen may crossover to the cathode 106 and combust with air.

The method of detecting hydrogen leaks may further include the system controller 294 monitoring a minimum anode stack inlet pressure that the fuel cell stack 12 achieves in the predetermined time period. The system controller 294 may identify a baseline level of an acceptable leak for the fuel cell stack 12 at the beginning of life of the fuel cell stack 12. The system controller 294 may track the volume of hydrogen leak change over time.

Less of a vacuum may be formed at the anode 104 of the fuel cell stacks 12 if the hydrogen leak is greater than the baseline level of an acceptable hydrogen leak. Furthermore, in large crossovers of hydrogen between the anode 104 and the cathode 106, no vacuum may be formed as air would immediately crossover to negate the vacuum. The system controller 294 may determine when to issue an output including a diagnostic alarm message to a user based on the detected hydrogen leak.

Figure 4:
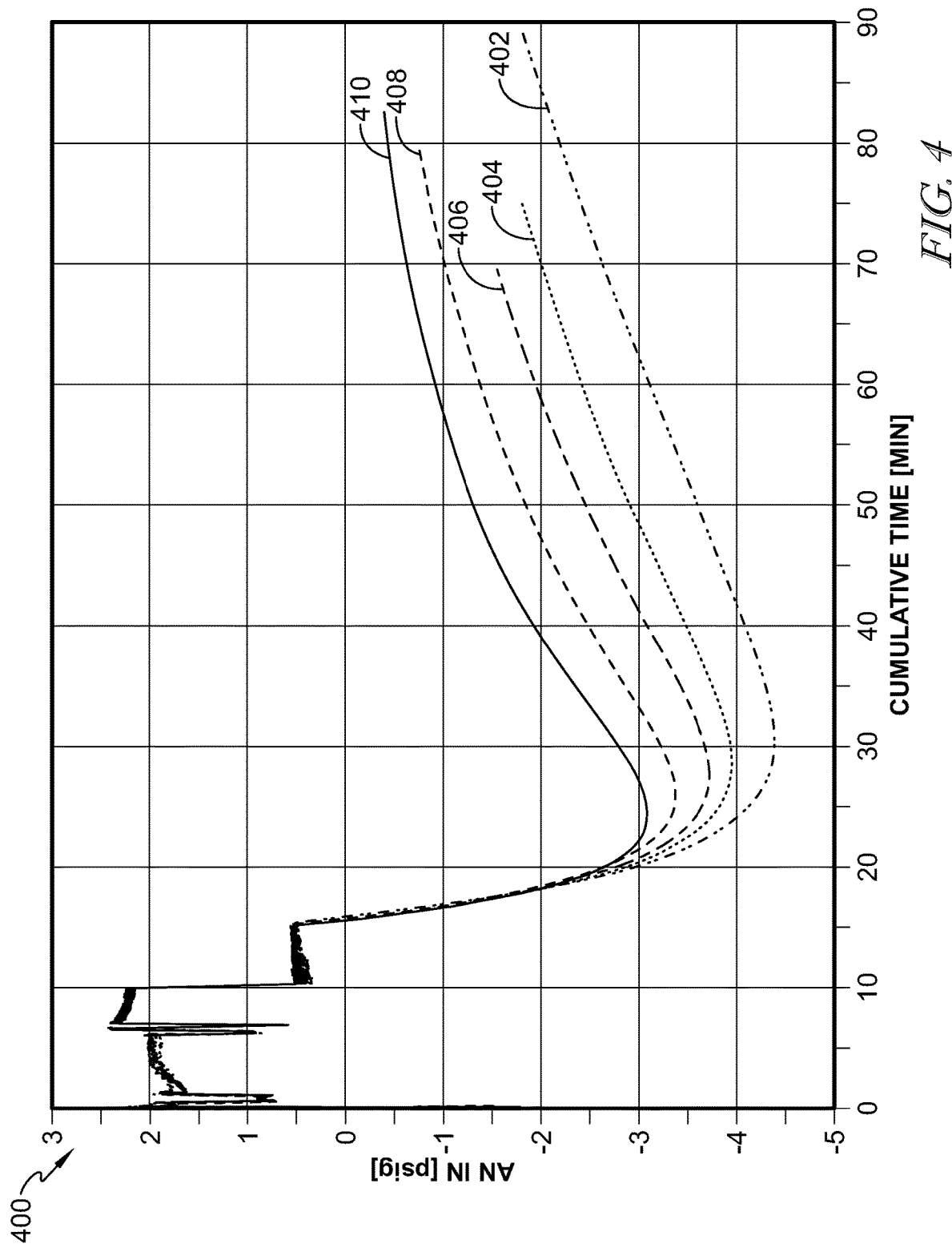
FIG. 4 is an illustration of a method of leak detection based on the minimum anode inlet stack pressure in a fuel cell stack.

FIG. 4 illustrates a graphical representation 400 of hydrogen leaks detected based on the minimum anode stack inlet pressure in the fuel cell stack 12. The fuel cell system 10 has a baseline leak of less than about 14 cubic centimeter (ccm; reference of 0° C., 101.3 kPa) as shown by curve 402. The leaks from the fuel cell stack 12 are in the range of about 14 ccm to about 88 ccm (reference of 0° C., 101.3 kPa) of 95% nitrogen and 5% helium, as shown by curves 404, 406, 408, 410. The minimum anode stack inlet pressure of the fuel cell stack 12 becomes less negative (e.g., becomes more positive) as the size of the leak increases. Thus, a hydrogen leak can be identified and/or detected by monitoring the minimum anode stack inlet pressure of the fuel cell stack 12.

In one embodiment, the method of detecting hydrogen leaks may include determining, detecting, and/or identifying the presence and/or location of a hydrogen leak in the anode 104. For example, the hydrogen leak may be greater than about 200 μm in diameter. This detection may occur by monitoring a rate of pressure drop in the anode 104 at the end of operation of the fuel cell system 10. The anode 104 pressure drop may be about 0.1 psi or greater than 0.1 psi. The rate of pressure drop may be measured by the pressure and/or temperature sensor or transmitter 156. End of operation of the system 10 or stack 12 may be defined after passage of an additional time period occurring after the fuel cell stack 12 has been discharged to a stack voltage of about 5V.

While the fuel cell stack 12 is discharging and during the additional time period (e.g., about 300 seconds), the fuel cell stack 12 may have a continuous supply or a toggling supply (e.g., pulsing, intermittent, or periodic) of hydrogen. This continuous or toggling supply of hydrogen feeds into the fuel cell stack 12. The continuous supply or toggling supply of hydrogen may be regulated by a control valve and/or regulator 120 (e.g., a control valve and/or a control regulator).

Alternatively or additionally, the additional time period after the fuel cell stack 12 has discharged to 5V may range from about 1 second to about 600 seconds including any specific or range of time comprised therein. For example, the additional time period after the fuel cell stack 12 has discharged to 5V may range from about 1 second to about 100 seconds, about 100 seconds to about 200 seconds, about 200 seconds to about 300 seconds, about 300 seconds to about 400 seconds, about 400 seconds to about 500 seconds, or about 500 seconds to about 600 seconds, including any specific or range of time comprised therein.

In some embodiments, the additional time period after the fuel cell stack 12 has discharged to 5V may be more than about 600 seconds. Using different additional time periods after the fuel cell stack 12 has discharged to 5V may result in a recalibration of the baseline level for acceptable hydrogen leakage. In some embodiments, the method of detecting the hydrogen leak of greater than about 200 μm in diameter in the anode 104 may be implemented for a time period known as a leak check time. The leak check time may be implemented after the additional time period described above. The leak check time may range from about 10 seconds to about 60 seconds, including any specific time period or range of time period comprised therein.

Figure 5:
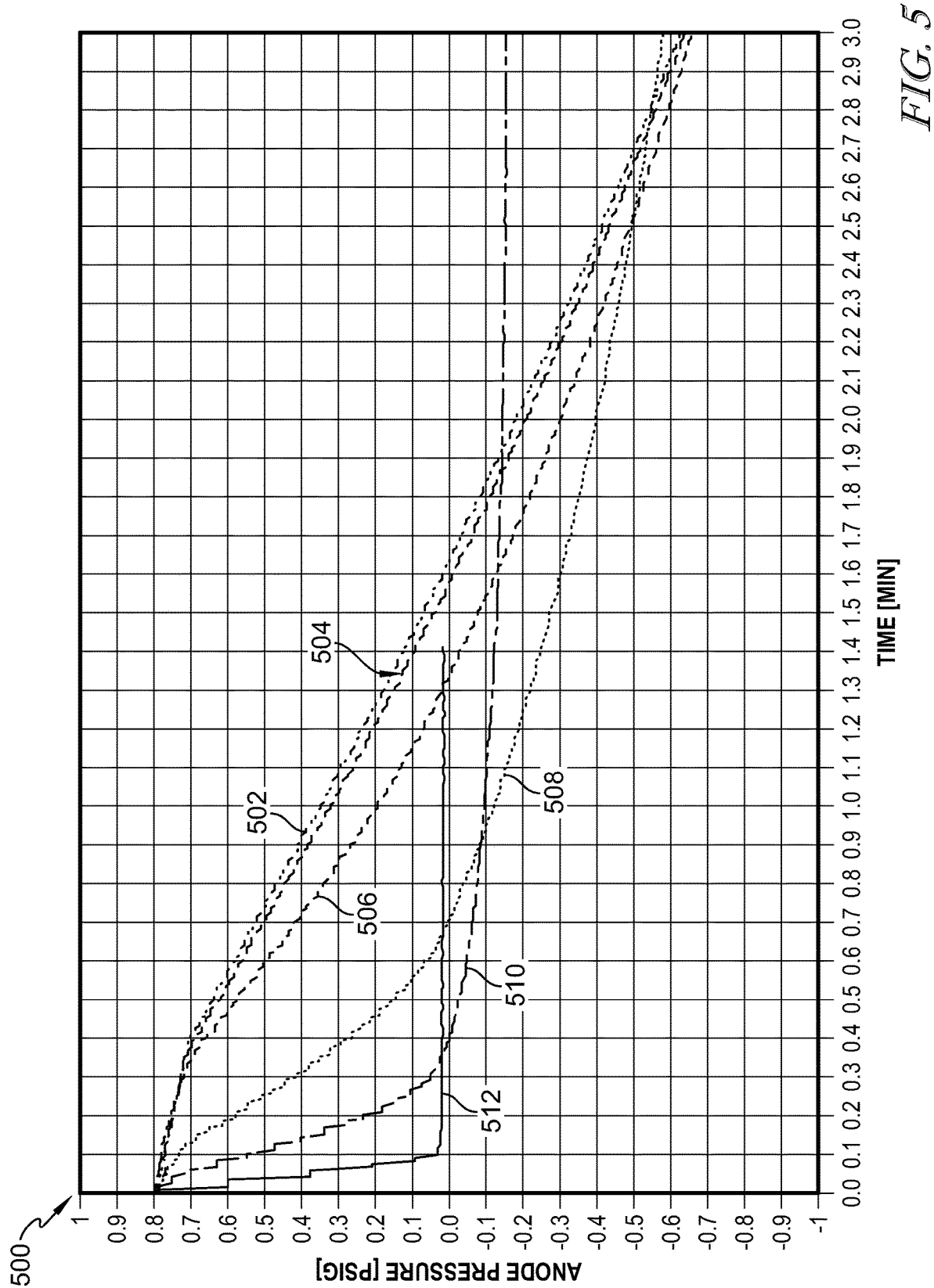
FIG. 5 is an illustration of a method of leak detection based on the based on the decay rate of anode stack inlet pressure in a fuel cell stack.

FIG. 5 illustrates a graphical representation 500 of the present method of detecting a hydrogen leak or hydrogen leak detection in the anode 104 based on the decay rate of anode stack inlet pressure. As shown by curve 502, the fuel cell system 10 has a baseline leak duly based on the fuel cell stack 12 design. Curve 504 identifies a baseline leakage plus an additional 50 micrometer of hydrogen leakage in the anode 104. Curve 506 identifies a baseline leakage plus an additional 100 micrometer of hydrogen leakage in the anode 104. Curve 508 identifies a baseline leakage plus an additional 200 micrometer of hydrogen leakage in the anode 104. Curve 510 identifies a baseline leakage plus an additional 350 micrometer of hydrogen leakage in the anode 104. Curve 512 identifies a baseline leakage plus an additional 700 micrometer leakage in the anode 104.

In one embodiment, the method may include detecting the hydrogen leak of greater than about 200 μm in diameter in the anode 104 by monitoring a rate of pressure drop in the hydrogen manifold 153 at the end of operation of the fuel cell system 10. The hydrogen manifold 153 pressure drop may range from about 30 psi and/or greater than 30 psi. The rate of pressure drop may be measured by the pressure and/or temperature transmitters 154. End of operation may be defined after the additional time period of about 300 seconds after the fuel cell stack 12 has been discharged to a stack voltage of 5V.

Figure 6:
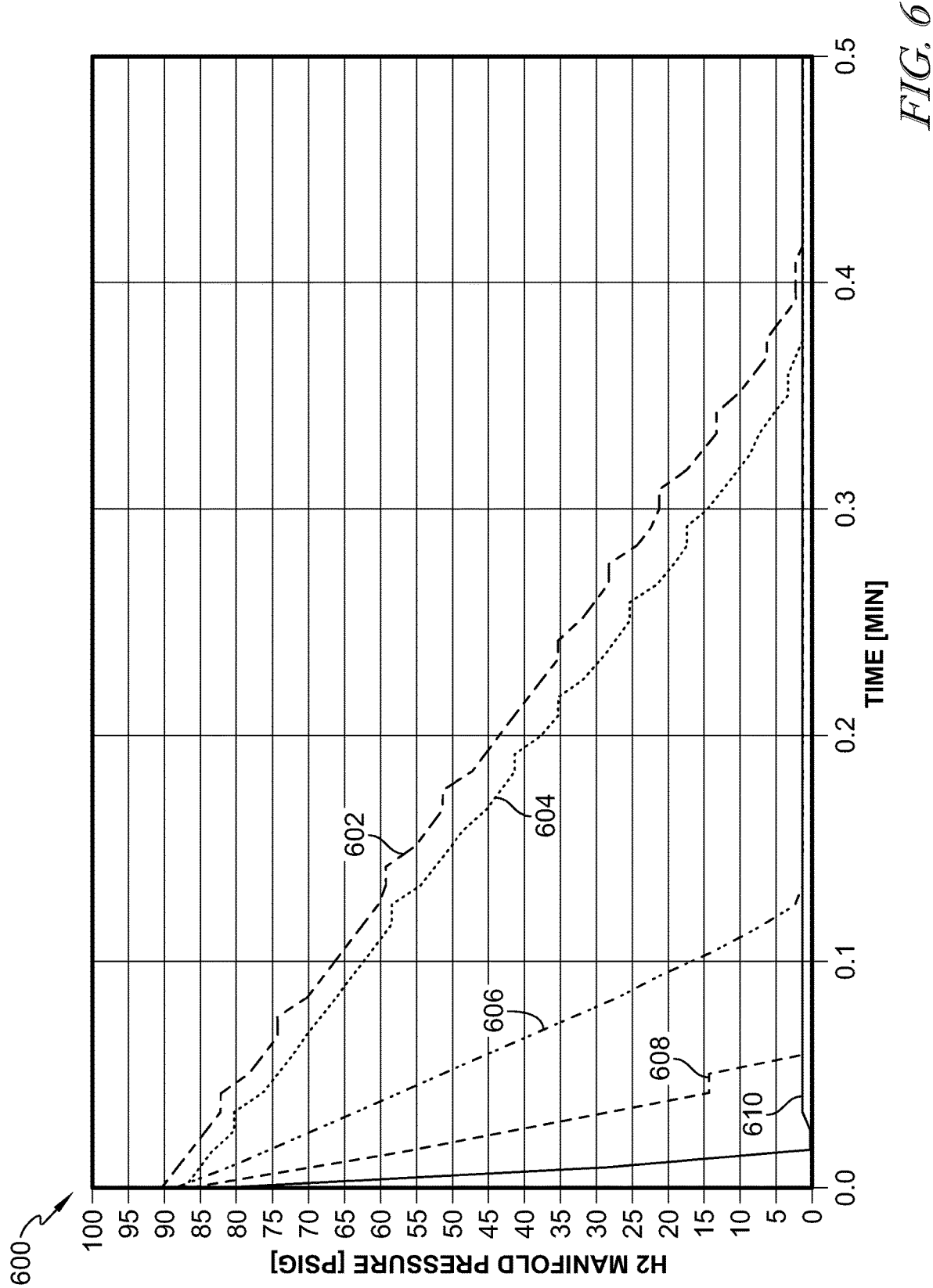
FIG. 6 is an illustration of a method of leak detection based on the based on the decay rate of decay rate of hydrogen manifold pressure.

FIG. 6 illustrates a graphical representation 600 of hydrogen leak detection in the anode 104 based on the decay rate of a hydrogen manifold pressure. The fuel cell system 10 has a baseline leak based on fuel cell stack 12 design, as shown by curve 602. Curve 604 identifies a baseline leakage with an additional 50 micrometer of hydrogen leakage in the anode 104. Curve 606 identifies a baseline leakage with an additional 200 micrometer of hydrogen leakage in the anode 104. Curve 608 identifies a baseline leakage with an additional 350 micrometer of hydrogen leakage in the anode 104. Curve 610 identifies a baseline leakage with an additional 700 micrometer of hydrogen leakage in the anode 104.

The one or more controllers 294 for monitoring and/or controlling the components in the fuel cell system 10 may be implemented, in some cases, in communication with hardware, firmware, software, or any combination thereof present on or outside the system 10 comprising the fuel cell or fuel cell stack 12. The one or more controllers 294 for monitoring and/or controlling the physical or virtual sensors (e.g., 154, 156) used in the system 10 may be implemented, in some cases, in communication with hardware, firmware, software, or any combination thereof present on or outside the system 10 comprising the fuel cell 20 or fuel cell stack 12. Information may be transferred to the one or more controllers using any one or more communication technology (e.g., wired or wireless communications) and associated protocols (e.g., Ethernet, InfiniBand®, Bluetooth®, WiMAX, 3G, 4G LTE, 5G, etc.) to effect such communication.

The one or more controller 294 may be in a computing device. The computing device may be embodied as any type of computation or computer device capable of performing the functions described herein, including, but not limited to, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and a mobile computing device.

The one or more controller 294 may include one or more of an input/output (I/O) subsystem, a memory, a processor, a data storage device, a communication subsystem, and a display that may be connected to each other, in communication with each other, and/or configured to be connected and/or in communication with each other through wired, wireless and/or power line connections and associated protocols (e.g., Ethernet, InfiniBand®, Bluetooth®, Wi-WiMAX, 3G, 4G LTE, 5G, etc.).

The processors may be embodied as any type of computational processing tool or equipment capable of performing the functions described herein. For example, the processor may be embodied as a single or multi-core processor(s), digital signal processor, microcontroller, or other processor or processing/controlling circuit. The memory may be embodied as any type of volatile or non-volatile memory or data storage capable of performing the functions described herein.

In operation, the memory may store various data and software used during operation of the one or more controller 294 such as operating systems, applications, programs, libraries, and drivers. The memory 206 is communicatively coupled to the processor via the I/O subsystem, which may be embodied as circuitry and/or components to facilitate input/output operations with the processor, the memory, and other components of the one or more controller 294.

For example, the I/O subsystem may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations.

In one embodiment, the memory may be directly coupled to the processor, for example via an integrated memory controller hub. Additionally, in some embodiments, the I/O subsystem may form a portion of a system-on-a-chip and be incorporated, along with the processor, the memory, and/or other components of the one or more controller 294, on a single integrated circuit chip.

The data storage device may be embodied as any type of device or devices configured for short-term or long-term storage of data such as, for example, memory devices and circuits, memory cards, hard disk drives, solid-state drives, or other data storage devices. The one or more controller 294 also includes the communication subsystem, which may be embodied as any communication circuit, device, or collection thereof, capable of enabling communications between the one or more controller 294 and other remote devices over the computer network.

The following described aspects of the present invention are contemplated and non-limiting:

A first aspect of the present invention relates to a method of detecting a hydrogen leak in a fuel cell system. The method comprises initiating a shutdown process of a fuel cell stack in the fuel cell system by a controller, measuring a volume of hydrogen in a hydrogen reservoir, replenishing the volume of hydrogen in the reservoir when the volume of hydrogen cannot sustain a voltage discharge during the shutdown process, discharging voltage in the fuel cell stack of the fuel cell system by the controller, wherein hydrogen and oxygen in the fuel cell stack are consumed in an electrochemical reaction, measuring a rate of the voltage discharge by the controller, and detecting the hydrogen leak based on the rate of the voltage discharge.

A second aspect of the present invention relates to a fuel cell system. The fuel cell system may comprise a fuel cell stack including an anode and a cathode, a discharge resistor operable to discharge voltage from the fuel cell stack, a system controller operable to, measure a rate of voltage discharge, and determine and/or identify a presence of a hydrogen leak in the fuel cell system based on the discharge voltage.

In the first aspect of the present invention, the system may comprise detecting an open purge valve in the fuel cell system. In the first aspect of the present invention, the voltage may be discharged by a discharge resistor. In the first aspect of the present invention, the hydrogen leak may occur through an external leak or through an anode to cathode crossover in the fuel cell stack.

In the first aspect of the present invention, the method may comprise detecting the hydrogen leak based on the rate of the voltage discharge comprises correlating the rate of voltage discharge to an expectant rate of voltage discharge in the fuel cell stack. In the first aspect of the present invention, the method may comprise correlating the rate of voltage discharge to the expectant rate of voltage discharge comprises using a look-up table, a map, an experimental data, or a calculation.

In the first aspect of the present invention, the method may comprise monitoring a minimum anode negative pressure achieved in a predetermined time period. In the first aspect of the present invention, the method may comprise determining that a hydrogen supply valve and one or more purge valves in the fuel cell system are closed before monitoring the minimum anode negative pressure. In the first aspect of the present invention, the method may comprise correlating the minimum anode negative pressure to an acceptable leak value based on a baseline level of an acceptable leak for the fuel cell stack at beginning of life of the fuel cell stack.

In the first aspect of the present invention, the method may comprise monitoring a minimum anode negative pressure achieved for an additional period after has the fuel cell stack has been discharged to a stack voltage of about 5V.

In the second aspect of the present invention, the system controller may be operable to determine the hydrogen leak based on a measurement of a minimum anode negative pressure achieved in a predetermined time period. In the second aspect of the present invention, the additional time period may range from about 2 minutes to about 2 hours. In the second aspect of the present invention, the system controller may use a look-up table, a map, an experimental data, or a calculation to determine the hydrogen leak. In the second aspect of the present invention, the system controller may be operable to identify the presence of the hydrogen leak based on a rate of pressure drop in the anode or a hydrogen manifold at the end of operation of the fuel cell system.

In the second aspect of the present invention, the pressure drop is after an additional time period after the end of operation of the fuel cell system. In the second aspect of the present invention, the additional time period may be about 1 second to about 300 seconds.

In the second aspect of the present invention, the system controller may be operable to identify the hydrogen leak of greater than about 200 μm in diameter. In the second aspect of the present invention, the discharge resistor may be operable to discharge voltage from the fuel cell stack for voltage discharge time, and wherein the controller may be operable to output an error message indicating that the hydrogen leak check has failed if the voltage discharge time is less than a predetermined discharge time period. In the second aspect of the present invention, the predetermined discharge time period may be about 1 second to about 50 seconds.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A fuel cell system comprising:
a fuel cell stack including an anode and a cathode,
a discharge resistor operable to discharge voltage from the fuel cell stack,
a system controller operable to measure a rate of voltage discharge and identify a presence of a hydrogen leak in the fuel cell system based on the discharge voltage.

2. The fuel cell system of claim 1, wherein the system controller is operable to determine the hydrogen leak based on a measurement of a minimum anode negative pressure achieved in a predetermined time period.

3. The fuel cell system of claim 1, wherein the system controller comprises a look-up table, a map, an experimental data, or a calculation to identify the location or presence of the hydrogen leak.

4. The fuel cell system of claim 1, wherein the system controller is operable to identify the presence of the hydrogen leak based on a rate of pressure drop in the anode or a hydrogen manifold of the fuel cell system.

5. The fuel cell system of claim 4, wherein the pressure drop is after an additional time period at the end of operation of the fuel cell system.

6. The fuel cell system of claim 5, wherein the additional time period ranges from about 1 second to about 300 seconds.

7. The fuel cell system of claim 1, wherein the system controller is operable to identify the presence of the hydrogen leak that is greater than about 200 μm in diameter.

8. The fuel cell system of claim 1, wherein the discharge resistor is operable to discharge the voltage from the fuel cell stack for a voltage discharge time, and wherein the system controller is operable to output an error message when the voltage discharge time is less than a predetermined discharge time period.

9. The fuel cell system of claim 8, wherein the predetermined discharge time period ranges from about 1 second to about 50 seconds.

10. The fuel cell system of claim 1, wherein the hydrogen leak occurs through an external leak or through an anode to cathode crossover in the fuel cell stack.

11. The fuel cell system of claim 1, wherein the system controller is operable to correlate the rate of voltage discharge to an expectant rate of voltage discharge in the fuel cell stack.

12. The fuel cell system of claim 1, further comprising a fuel supply source fluidly coupled with an inlet of the anode of the fuel cell stack and a shut off valve arranged between the fuel supply source and the inlet of the anode.

13. The fuel cell system of claim 12, further comprising a sensor arranged between the shut off valve and the inlet of the anode and configured to measure a pressure and a temperature of a flow of hydrogen into the inlet of the anode.

14. The fuel cell system of claim 13, further comprising a hydrogen reservoir arranged between the shut off valve and the inlet of the anode to store a fixed amount of hydrogen for use during shutdown of the fuel cell system.

15. The fuel cell system of claim 14, further comprising a pressure switch arranged between the hydrogen reservoir and the sensor and configured to disable the shut off valve to stop the flow of hydrogen into the inlet of the anode.

16. The fuel cell system of claim 15, further comprising a purge valve configured to remove hydrogen from an outlet of the anode opposite the inlet, and wherein the hydrogen leak occurs at the purge valve.

17. The fuel cell system of claim 4, wherein the system controller comprises a look-up table or a calculation to identify the location or presence of the hydrogen leak.

18. The fuel cell system of claim 4, wherein the rate of pressure drop in the anode of about 0.1 psi or greater is indicative of the presence of the hydrogen leak.

19. The fuel cell system of claim 4, wherein the rate of pressure drop in the hydrogen manifold of about 30 psi or greater is indicative of the presence of the hydrogen leak.

20. The fuel cell system of claim 1, further comprising a purge valve configured to remove hydrogen from an outlet of the anode opposite an inlet, and wherein the hydrogen leak occurs at the purge valve.

* * * * *